United States Patent [19]

SanGregory et al.

[11] Patent Number: 5,416,547
[45] Date of Patent: May 16, 1995

[54] CAMERA LENS FOCUS AND SHUTTER APERTURE SETTING

[75] Inventors: Jude A. SanGregory, Spencerport; Leonard Richiuso, Rochester, both of N.Y.

[73] Assignee: Eastman Kodak Company, Rochester, N.Y.

[21] Appl. No.: 146,632

[22] Filed: Oct. 29, 1993

[51] Int. Cl.⁶ .................................................. G03B 3/10
[52] U.S. Cl. ............................ 354/195.11; 354/234.1
[58] Field of Search .............. 354/400, 195.1, 195.11, 354/228, 230, 234.1

[56] References Cited

U.S. PATENT DOCUMENTS

| | | | |
|---|---|---|---|
| 4,426,145 | 1/1984 | Hashimoto | 354/195.1 |
| 4,728,979 | 3/1988 | Akitake et al. | 354/400 |
| 4,918,480 | 4/1990 | Hori | 354/400 |
| 5,032,859 | 7/1991 | Akimoto et al. | 354/195.1 |

Primary Examiner—David M. Gray
Attorney, Agent, or Firm—Roger A. Fields

[57] ABSTRACT

A lens shutter camera includes a movable picture taking lens that can be moved along an optical axis and positioned at a focus setting such that a camera subject is in focus, an adjustable shutter aperture mechanism that controls the amount of ambient light passing through the picture taking lens for producing an exposure, and a drive source that moves the picture taking lens to position the lens at the focus setting; wherein movement of the picture taking lens toward the focus setting position simultaneously adjusts the shutter aperture mechanism to an exposure setting that permits a predetermined amount of ambient light necessary for proper exposure to pass through the lens.

20 Claims, 7 Drawing Sheets

CAMERA LENS FOCUS AND SHUTTER APERTURE SETTING

BACKGROUND OF THE INVENTION

1. Field of the Invention

This invention relates generally to camera lens focus and shutter aperture setting and, more particularly, to setting the lens focus and shutter aperture of a camera using a single drive motor.

2. Description of the Related Art

Automatic focus, automatic exposure cameras are quite popular because they are easy to use. Such cameras automatically determine and set the appropriate lens focus position and aperture size. The automatic focus feature requires a movable picture taking lens, a subject distance measuring system that determines the distance from the camera to a photographic subject, and a lens focus mechanism that moves the picture taking lens in response to the subject distance measuring system. The lens focus mechanism moves the picture taking lens to a lens focus position, at which the image of the subject that is formed by the lens is in focus at a film focal plane of the camera. The automatic exposure feature requires a shutter mechanism and an aperture mechanism to permit light to pass through the picture taking lens, through an aperture of predetermined size, and onto a photographic film located at the film focal plane for a predetermined shutter time interval. Typically, the shutter mechanism and aperture mechanism are controlled by a light measuring and exposure calculating system that determines a proper exposure setting, which specifies an aperture size and a shutter time interval. If an aperture of the specified size is maintained open for the specified shutter time interval, then a proper exposure should be produced on the film.

To reduce cost, size, and weight, the shutter and aperture mechanisms frequently are combined into a single lens shutter mechanism in which shutter blades open for a predetermined time interval and then close, producing an exposure. Cameras equipped with such combined mechanisms are typically referred to as lens shutter cameras. A lens shutter mechanism can operate so as to open the shutter blades relatively slowly up to a maximum opening size regardless of the aperture specified by the light measuring system and remain locked open. The blades are closed after an amount of light passes through the lens shutter mechanism that is approximately equal to the light that would have passed through the lens if the shutter mechanism had been held open for the specified aperture for the specified time interval. Such lens shutter mechanisms are referred to as program shutters or slow-opening shutters. Other lens shutter mechanisms are quickly opened to the specified aperture size, held open for the specified time interval, and then are quickly closed. Such mechanisms are referred to as fast-opening shutters.

Because a slow opening lens shutter is not required to have especially fast operation, cameras equipped with such lens shutter mechanisms can be constructed with a single motor to both move the lens and operate the aperture/shutter mechanism rather than using separate motors to perform the functions. Using a single motor further reduces camera cost, size, and weight. Unfortunately, exposure accuracy is reduced as compared with a fast opening shutter using a separate drive motor to position the lens and operate the shutter.

In addition, some lens shutter mechanisms use a single motor and a reversing scheme to position a lens and then operate a shutter, which generally produces exposure lag time. For example, a single motor is driven to rotate in a first direction for moving the lens to the lens focus position and then is reversed to rotate in a second direction for operating the shutter/aperture mechanism. Thus, the motor must be reversed before the shutter blades are opened. Unfortunately, if the motor must be reversed, then the motor must be stopped temporarily to change from moving the lens to operating the shutter/aperture mechanism. In addition, reversing requires a certain amount of time for the drive motor to respond. The temporary stopping and response time result in a delay from the time a camera operator presses a shutter release button to the actual opening of the shutter blades and beginning of the exposure process. Cameras having a single motor that is driven in a first direction to set lens focus position and then is reversed to operate the shutter/aperture mechanism are described, for example, in U.S. Pat. No. 4,426,145 to Hashimoto and U.S. Pat. No. 4,918,480 to Hori.

To avoid the time lag inherent in cameras that first set a lens focus position and then reverse the motor to control shutter/aperture operation, it is known to drive a motor in a single direction to first set the lens focus position and then control the shutter/aperture mechanism. Unfortunately, such systems can require complex gear trains or control systems that do not fully exploit the cost, size, and weight advantages gained by the lens shutter design.

In U.S. Pat. No. 4,728,979 to Akitake, for example, a camera uses a single motor to set lens focus and operate a shutter/aperture assembly while continuously operating the motor in a single drive direction by using a differential gear train comprising a set of planetary gears that transmit motor torque through a lens focus setting gear train or a shutter/aperture operating gear train. While the application notes that time lag is reduced, the differential gear train unfortunately fails to fully exploit the cost, size, and weight advantages gained by the single-motor lens shutter design.

Fast opening lens shutter designs generally provide accurate exposures, but can require complex movements or many actuators. Separate motors, for example, might be used to position the lens, adjust the aperture, and operate the shutter. Other fast opening lens shutter designs use cams and latches to set the aperture, but they require reversing movement to unlatch the aperture mechanism followed by further movement to initialize the lens position and aperture setting, such movements being performed sequentially. Multiple actuators increase weight, size and cost. Complex movements create delays between successive exposures.

From the discussion above, it should be apparent that there is a need for a lens shutter camera that sets the lens focus position and aperture size of the shutter/aperture mechanism, while minimizing the time lag from the time a camera operator presses a shutter release button to the actual initiation of the exposure process, without requiring complex gear trains and control systems. The present invention fulfills this need.

SUMMARY OF THE INVENTION

The present invention provides an apparatus for setting the lens focus and shutter aperture of a camera having a movable picture taking lens that can be moved along an optical axis and positioned at a focus setting such that a camera subject is in focus, an adjustable shutter aperture mechanism that controls the amount of ambient light passing through the picture taking lens for producing an exposure, and a drive source that moves the picture taking lens to position the lens at the focus setting, wherein movement of the picture taking lens toward the focus setting position simultaneously adjusts the shutter aperture mechanism to an exposure setting that permits a predetermined amount of ambient light necessary for proper exposure to pass through the lens.

In accordance with the invention, a lens shutter camera includes a movable picture taking lens, an adjustable shutter/aperture mechanism that controls the amount of ambient light passing through the picture taking lens, and a drive source that is operated continuously in a setting direction of travel to move the picture taking lens to a focus position and simultaneously move the shutter/aperture mechanism to an exposure setting. Once the exposure aperture is set, a shutter drive mechanism quickly operates the shutter/aperture to deliver the specified amount of light for a proper exposure. In this way, the camera sets the lens focus position and simultaneously sets the aperture size, thereby minimizing the time lag from the time a camera operator presses a shutter release button to the actual initiation of the exposure process without requiring complex gear trains and control systems.

Other features and advantages of the present invention should be apparent from the following description of the preferred embodiments, which illustrate, by way of example, the principles of the invention.

DESCRIPTION OF THE PREFERRED EMBODIMENT

Figure 1:
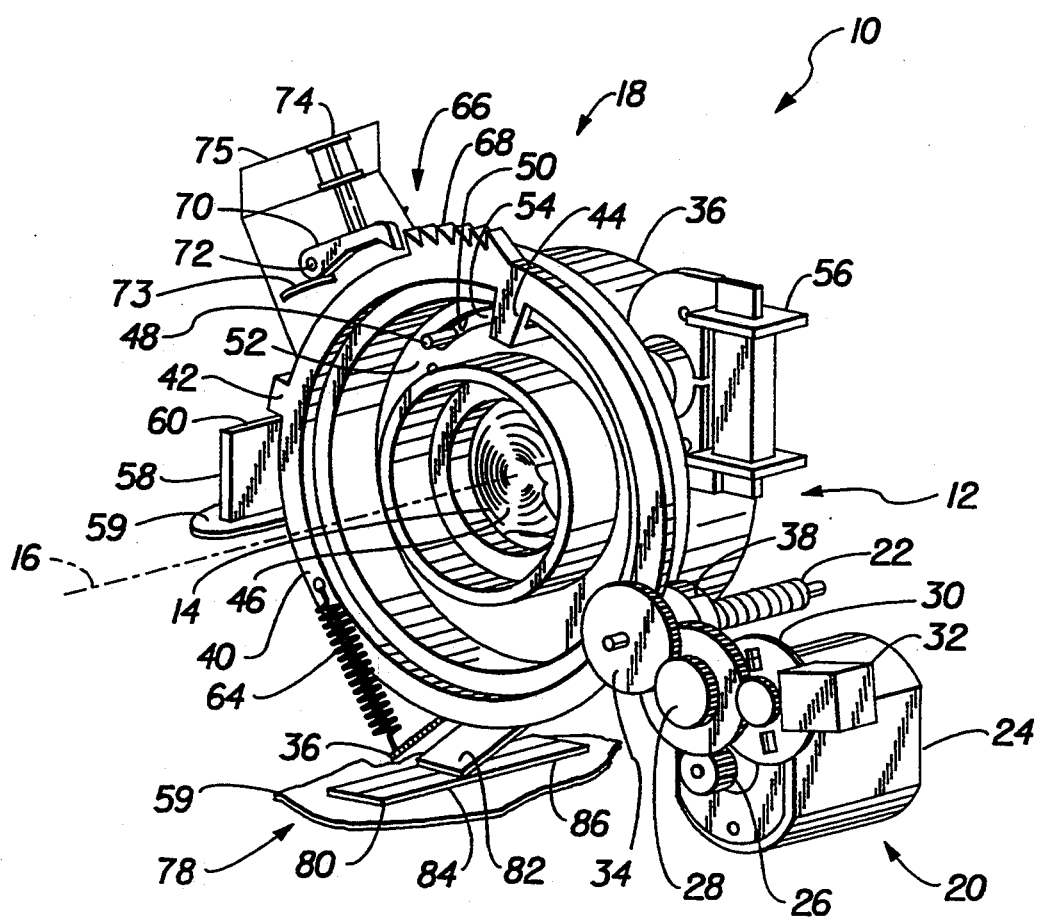
FIGS. 1, 2, 3, 4, and 5 are perspective views of a lens focus and shutter aperture setting assembly constructed in accordance with the present invention.

With reference to FIGS. 1 through 5, a combined lens focus and shutter/aperture assembly 10 for a camera constructed in accordance with the present invention includes a lens focus mechanism 12 having a movable picture taking lens 14 with an optical axis 16 along which the lens can be moved. The assembly also includes an adjustable shutter/aperture mechanism 18 that controls the amount of light passing through the lens for producing an exposure in the camera. The lens focus mechanism and shutter/aperture mechanism are coupled such that moving the lens to a focus position simultaneously adjusts the shutter aperture mechanism to an exposure setting that permits a predetermined amount of ambient light necessary for proper exposure to pass through the lens. In this way, the assembly 10 sets the lens focus position and simultaneously sets aperture size, thereby minimizing the time lag from the moment a camera operator presses a shutter release button to the actual initiation of the exposure process without requiring complex gear trains and control systems.

Figure 2:
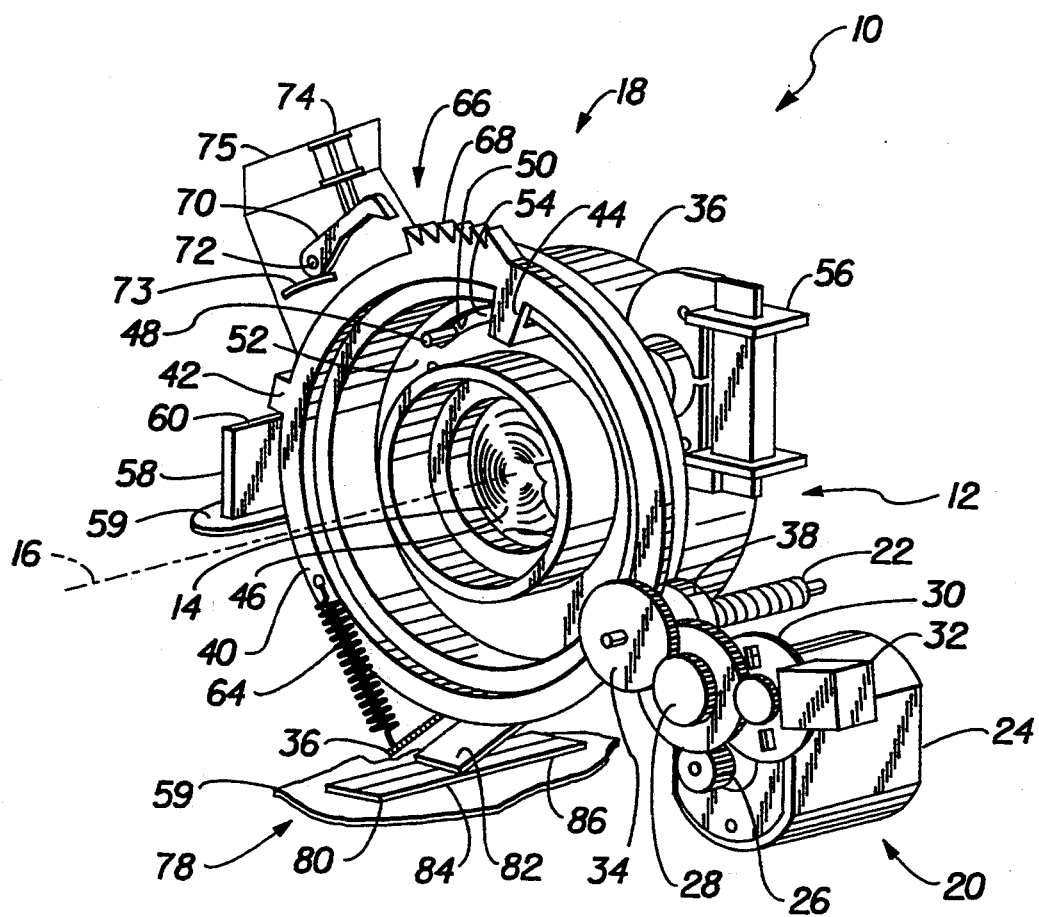
Figure 3:
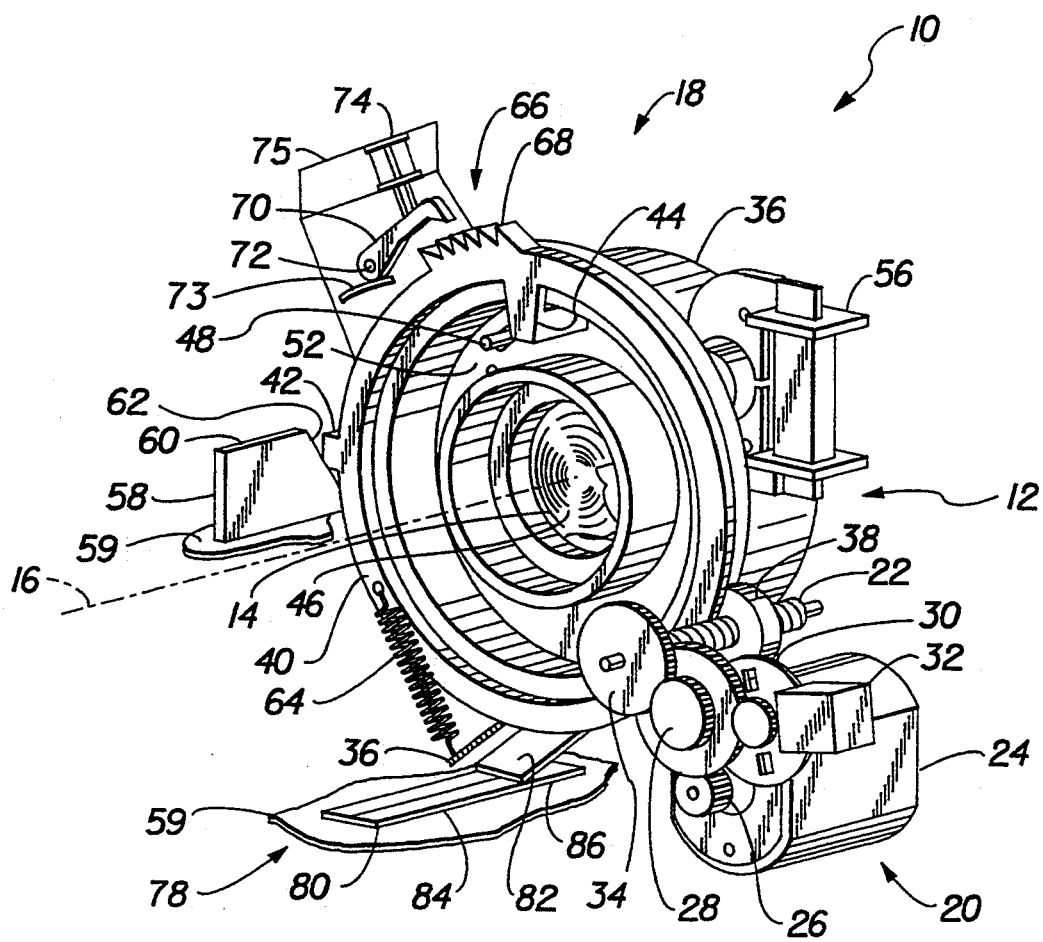
Figure 4:
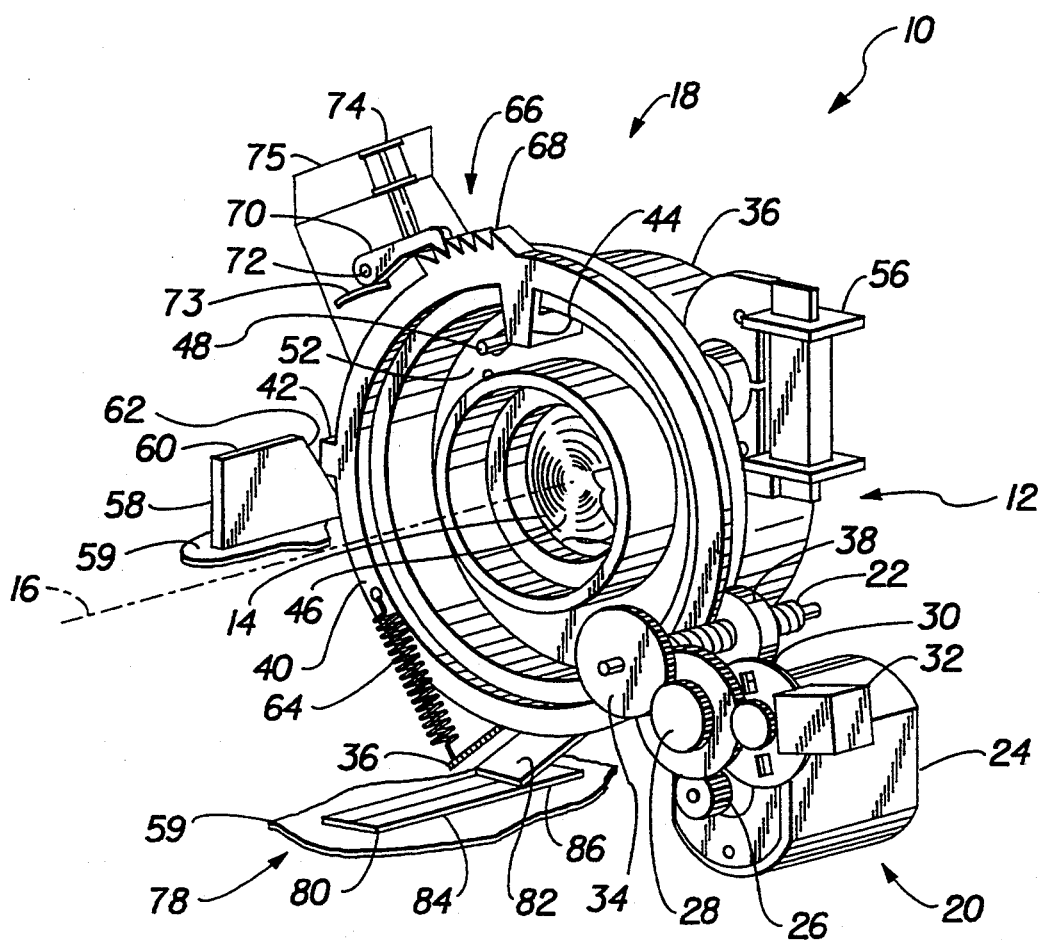
Figure 5:
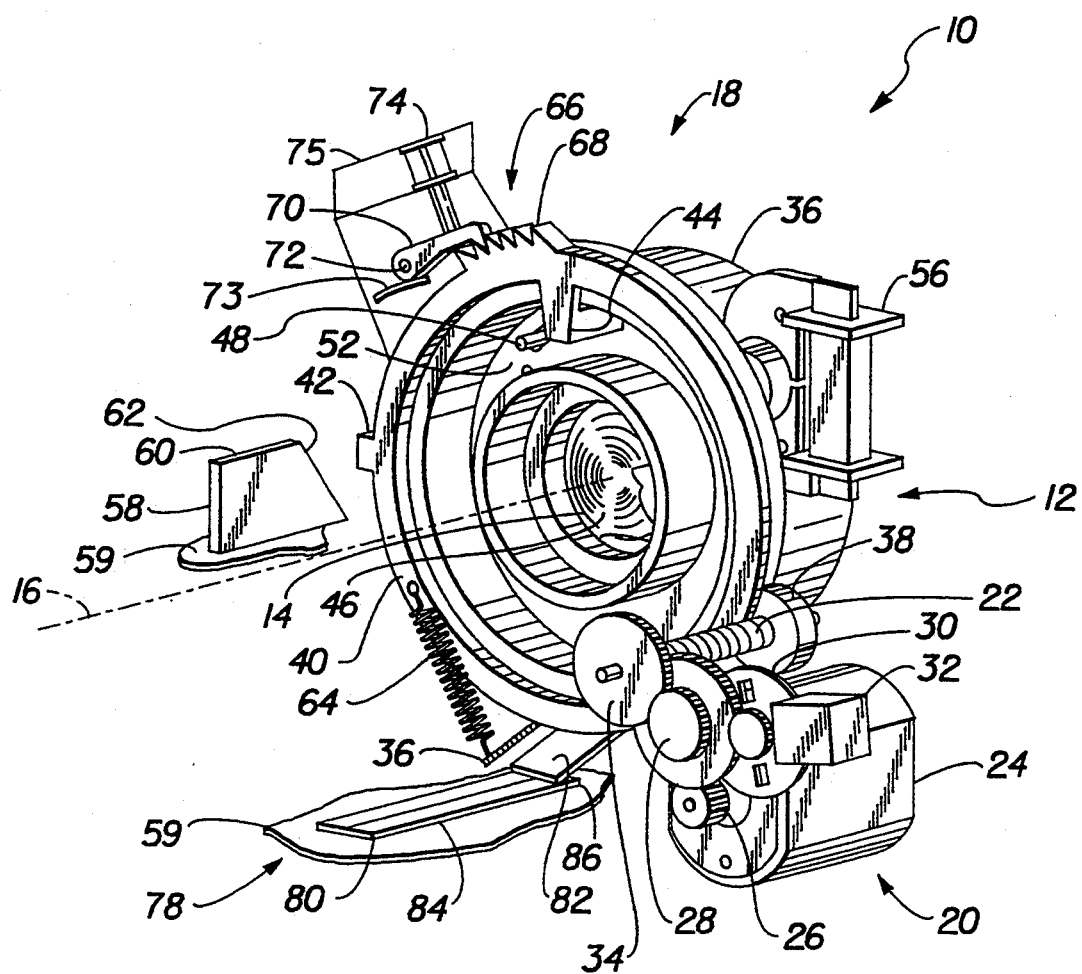

The lens is moved from a deployed position illustrated in FIG. 1 through an aperture setting range of movement illustrated in FIGS. 2 and 3, during which the aperture size is adjusted, and is set for proper exposure, as illustrated in FIG. 4, and then the lens is moved into a lens focus setting range of movement. Lens movement in the focus setting range is halted when the lens reaches a focus position at which the image formed by the lens is in focus at a film plane of the camera, as illustrated in FIG. 5. After an exposure is produced, the lens is returned to the deployed position illustrated in FIG. 1, ready to be moved again to set the aperture size and then stop at the focus position.

More particularly, the lens 14 is driven by a lens motor assembly 20 having a drive screw 22, which is driven by a lens drive motor 24 having an output drive gear 26 coupled to a reduction gear 28. The reduction gear drives a perforated disk 30, whose rotation is sensed by an optical counter 32. Pulses generated by the optical counter are used by a camera central processor unit to determine the relative position of the lens focus assembly 12, as described further below. The reduction gear 28 drives the drive screw 22 by driving a barrel gear 34 that is attached to one end of the drive screw. The lens 14 is carried within a lens barrel 36 that is coupled to the drive screw 22 by a barrel nut 38 affixed to the lens barrel. The barrel nut has a threaded central aperture that is engaged with the threads of the drive screw 22. Thus, as the drive screw rotates, the barrel nut 38 moves lengthwise along the drive screw, thereby moving the lens barrel and lens in the same direction. The lens focus mechanism 12 is coupled to the shutter/aperture mechanism 18 so that, as the lens barrel 36 is moved, the shutter/aperture mechanism is adjusted.

Adjustment of the shutter/aperture mechanism 18 occurs through rotation produced by longitudinal movement of the lens barrel 36. The shutter/aperture mechanism includes an aperture ring 40 having an adjustment tab 42 and a limit tab 44. The shutter/aperture mechanism also includes a plurality of shutter blades 46 that are coupled to a shutter pin 48. The shutter pin extends through a groove 50 of a shutter faceplate 52 and is connected to a shutter actuation plate 54, which is visible through the groove 50. When the shutter actuation plate is driven, the shutter pin 48 will move within the groove, thereby opening the shutter blades 46, until the shutter pin makes contact with the limit tab 44 of the aperture ring 40. The limit tab halts the travel of the shutter pin, actuation plate, and shutter blades, thereby limiting the size of the aperture.

A shutter drive motor 56 drives the shutter actuation plate 54 to actuate the shutter blades. Rotational movement of the aperture ring moves the position of the limit tab 44 relative to the shutter pin groove 50. In this way, the maximum aperture opening created by the shutter blades 46 can be adjusted. The shutter drive motor preferably operates quickly to open the shutter blades up to the size necessary for proper exposure, lock them open for the time necessary for proper exposure, and then quickly close them. Thus, the shutter/aperture mechanism constitutes a fast-opening shutter. Those skilled in the art will recognize that the principles of the invention also can be applied to slow-opening shutter designs.

Adjustment of the aperture ring 40 occurs through movement of the aperture adjustment tab 42 relative to a fixed frame ramp 58. The frame ramp does not move with either the lens focus mechanism 12 or shutter/aperture mechanism 18 because it is part of or is affixed to a frame portion 59 of the camera. FIG. 1 shows the assembly 10 in a resting or deployed position with the adjustment tab 42 resting on a deployment edge 60 of the frame ramp 58. FIG. 2 shows the assembly beginning the aperture setting range of movement. FIG. 3 and FIG. 4 show the assembly in aperture setting positions and FIG. 5 shows the assembly in a lens focus position.

FIG. 3 shows the assembly 10 after the lens drive motor 24 has driven the lens barrel 36 along the optical axis and away from the fixed ramp 58. As illustrated in the drawing, the adjustment tab 42 travels along the deployment edge 60 of the fixed ramp and then follows an inclined edge 62 of the ramp. As the adjustment tab follows the inclined edge, the aperture ring 40 is rotated relative to the shutter pin 48. As noted above, rotation of the aperture ring moves the limit tab 44 relative to the shutter pin and thereby changes the maximum aperture that can be achieved by the shutter blades 46. The aperture ring 40 is urged to rotate counter-clockwise in FIG. 2 such that the tab 42 remains in contact with the frame ramp 58 by an extension spring 64 and is locked in place at an appropriate aperture setting by a ratchet pawl mechanism 66, as shown in FIG. 4. The extension spring is illustrated as a coil spring attached at one end to the aperture ring and attached at the other end to the lens barrel 36, but other means for forcing the ring to rotate as described will occur to those skilled in the art.

The ratchet pawl mechanism 66 includes a plurality of ratchet teeth 68 located along the outer periphery of the aperture ring 40. A pawl 70 pivots about a pin 72 so as to engage one of the ratchet teeth. At the start of the aperture setting range of movement, illustrated in FIG. 2, a solenoid 74 lifts the pawl 70 out of engagement with the ratchet teeth 68. The lens barrel 36 eventually moves the aperture/shutter mechanism 18 such that the aperture ring 40 is positioned to limit shutter blade travel for a proper exposure, as illustrated in FIG. 3, and then the solenoid releases the pawl under the control of a central processor unit. The pawl drops into engagement with the ratchet teeth, thereby preventing further rotational movement of the aperture ring, as illustrated in FIG. 4. A ratchet spring 73 urges the pawl into engagement with the ratchet teeth when the solenoid releases. It is not necessary to stop movement of the lens barrel 36 to set the aperture, because the pitch of the ratchet teeth and force of the ratchet spring are selected to provide rapid, precise setting of the aperture.

The ratchet pawl 70 and solenoid 74 are coupled to the lens barrel 36 by a barrel extension 75 so that they move longitudinally along the optical axis 16 with the aperture ring 40, thus ensuring engagement of the pawl with the ratchet teeth 68 throughout the movement of the lens barrel. Alternatively, the solenoid and ratchet pawl can be configured so that they do not move longitudinally with the aperture ring. In such a configuration, either the ratchet teeth or the pawl can be constructed with a longitudinal extent sufficient to ensure engagement with the other throughout the longitudinal travel of the lens barrel.

In FIG. 5, the lens barrel 36 has reached a lens focus position near the limit of the lens barrel range of travel. As illustrated in the drawing, the ratchet pawl mechanism 66 maintains the aperture ring 40 in the specified aperture setting, despite the fact that the lens barrel has moved the aperture ring along the optical axis 16 such that the adjustment tab 42 is no longer in engagement with the fixed frame ramp 58. The shutter motor 56 can now drive the shutter blades 46 open to the limit set by the position of the limit tab 44. Because the shutter motor 56 is relatively quick acting, the limit tab 44 is set to provide an aperture in accordance with an opening size determined by an exposure measuring system. This provides a relatively high degree of exposure accuracy. Alternatively, the motor can provide what is referred to as a slow-opening lens shutter.

Following activation of the shutter blades, the lens drive motor 24 is reversed and the lens barrel 36 is moved in the reverse direction along the optical axis 16, carrying the aperture ring 40 with it. Thus, the adjustment tab 42 will once again come into contact with the inclined edge 62 of the fixed frame ramp 58. Preferably, the motor 24 has sufficient torque to move the lens focus mechanism 12 and shutter/aperture mechanism 18 such that the aperture ring will rotate and the ratchet pawl 70 will ratchet and permit the aperture ring to return to the deployed position. That is, the pawl 70 will be lifted up against the force of the ratchet spring 73 and extension spring 64 as the lens barrel is moved from the lens focus position back to the deployed position such that the adjustment tab 42 will come to rest on the top edge 60 of the frame ramp. During the next movement of the lens barrel 36 in the focus direction, the solenoid 74 is activated to once again lift the pawl 70 out of engagement with the ratchet teeth 68, as illustrated in FIG. 2. Thus, the lens drive motor 24 can be operated continuously from initial activation of the assembly 10 to return of the lens to the deployed position. The continuous operation reduces lag time and permits rapid producing of exposures.

As noted above, the lens drive motor 24 includes a perforated disk 30 and optical counter 32 that permit a central processor of the camera to determine the position of the lens barrel. Preferably, the lens focus and shutter/aperture assembly 10 includes a fail-safe mechanism to prevent travel of the lens barrel 36 beyond acceptable limits. The fail-safe mechanism is a limit switch 78 that comprises a conductive strip 80 attached to the camera frame 59 and a metal wiper 82 attached to the lens barrel 36. A first conductive pad 84 is placed at a location on the conductive strip that corresponds to a lens barrel position at the deployed position, as illustrated in FIG. 1. Thus, a complete electrical path from the wiper 82 through the strip 80 is made when the lens barrel is at the deployed position. Similarly, a second conductive pad 86 is located at the limit of the permitted lens barrel of travel, as illustrated in FIG. 5.

With the limit switch 78 as described above, a simple electrical circuit can be constructed to permit the central processor of the camera to determine when the lens barrel 36 is at the limit of its range of travel. The control processor then prevents continued operation of the lens drive motor 24. Thus, if the lens barrel position should fail to coincide with the position assumed by the camera central processor, due to component failure or lens barrel movement caused by an external force or the like, then the central processor will become aware of the situation when one of the limit contacts is closed. The camera central processor thereby has a precise indication of the lens barrel position. The lens drive motor then will again be synchronized with the lens barrel position.

Figure 6:
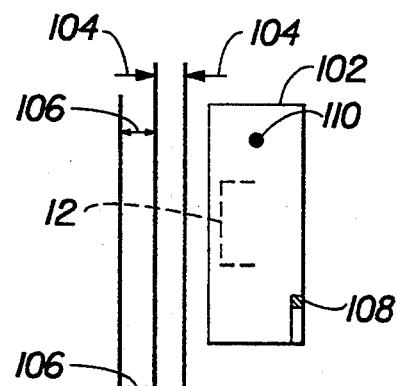
FIGS. 6, 7, 8, 9, and 10 are plan views illustrating the operation of a camera equipped with the assembly shown in FIGS. 1–5.
Figure 7:
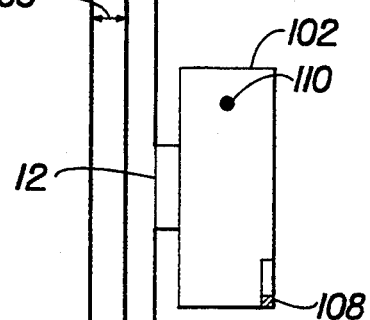

FIGS. 6–10 show a plan view of a camera 102 constructed in accordance with the present invention through the stages of movement of the camera lens. In particular, the range of lens movement corresponding to the setting of the aperture size is indicated by aperture range arrows 104 and the range of lens movement corresponding to the focus range of the lens is indicated by lens range arrows 106. In FIG. 6, a camera on/off switch 108 is set to the "off" position and therefore the lens focus mechanism has retracted the camera lens within the camera to a parked position. In FIG. 7, the on/off switch has been moved to the "on" position and therefore the lens focus mechanism has extended the camera lens from the camera body into the deployed position. The position of the lens focus mechanism in FIG. 7 corresponds to the position illustrated in FIG. 1.

Figure 8:
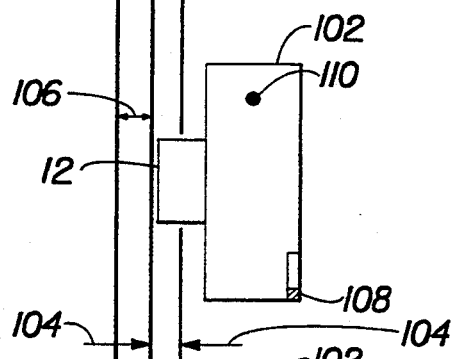
Figure 9:
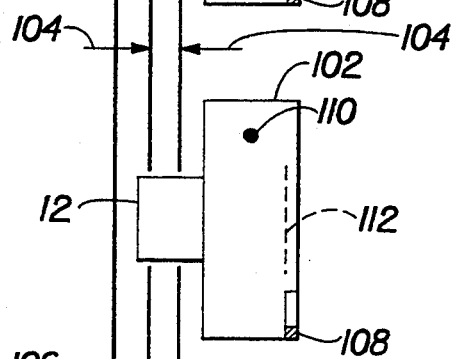
Figure 10:
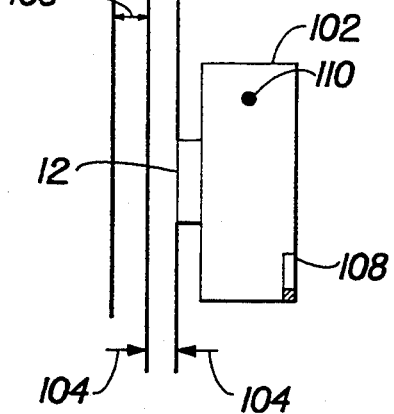

In FIG. 8, a shutter release button 110 of the camera has been pressed and therefore the lens is extended into the aperture setting range indicated by the aperture range arrows 104. The lens position shown in FIG. 8 corresponds to the lens position shown in FIGS. 3 and 4. In FIG. 9, the aperture size has been set and therefore the lens continues further in its movement into the focus range indicated by the focus range arrows 106. The lens position of FIG. 9 corresponds to that illustrated in FIG. 5. When the lens has reached the lens focus position, the lens is stopped and the shutter blades are automatically opened and closed so that an exposure is produced at a film plane 112 of the camera. Following the exposure, the lens is retracted back to the deployed position, as illustrated in FIG. 10. As noted above, the deployed lens position corresponds to that illustrated in FIG. 1.

Figure 11:
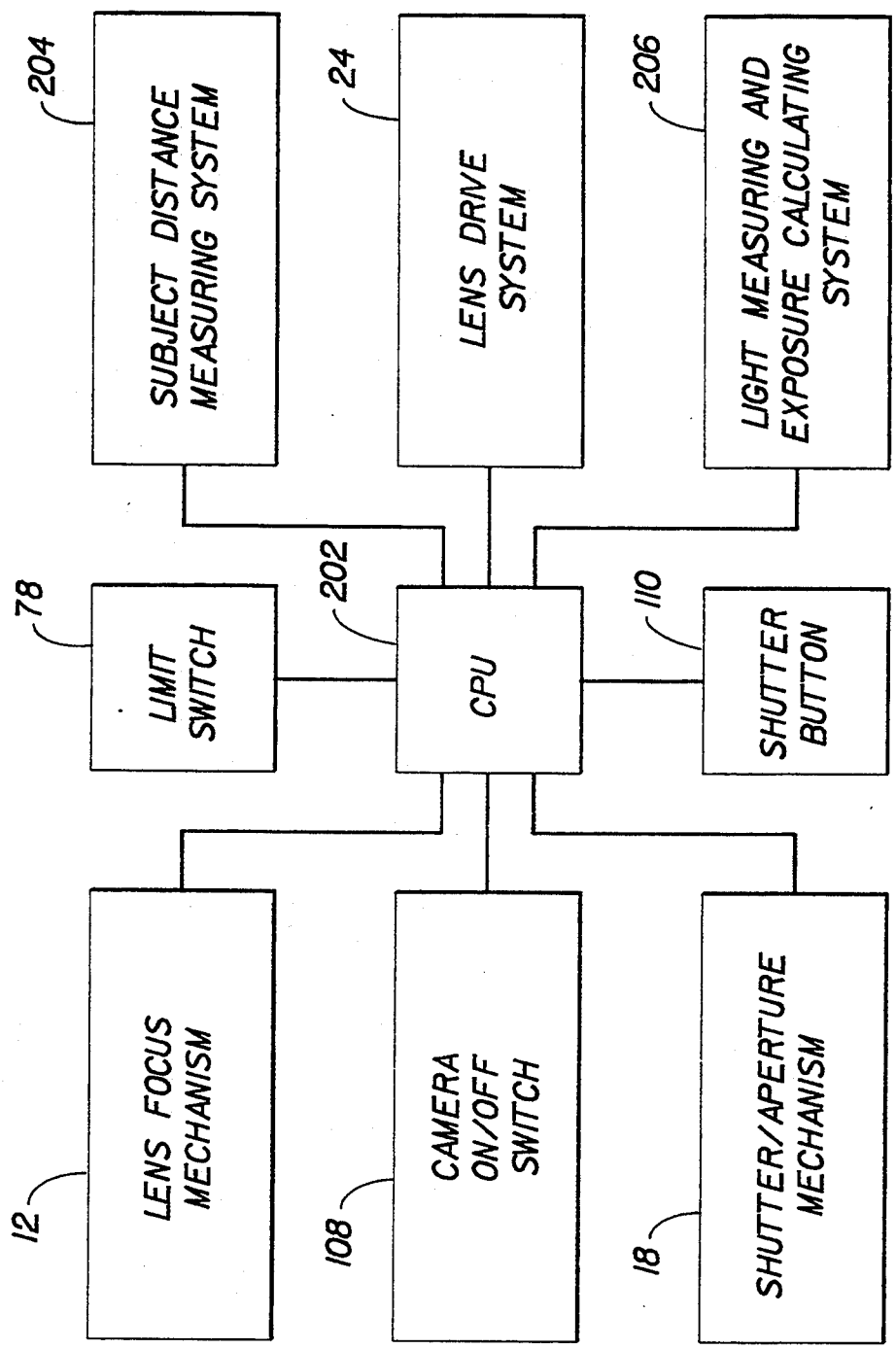
FIG. 11 is a block diagram of the camera illustrated in FIGS. 6–10.

FIG. 11 is a block diagram of the camera 102 constructed in accordance with the present invention. A central processor unit (CPU) 202 is activated by the on/off switch 108 of the camera. When the switch is moved to the "on" position, the CPU controls the lens focus mechanism 12 and lens drive motor 24 to move the lens barrel to the deployed position. When the shutter release button 110 is pressed, the CPU receives information from a subject distance measuring system 204 and a light measuring and exposure calculating system 206. The CPU controls the lens drive motor, receiving movement information from the optical counter 32 and limit switch, to move the barrel through the aperture setting range, where the CPU controls the solenoid 74 to release the pawl and set the aperture, and controls the motor to move the barrel into the lens focus range, where the CPU halts the lens barrel at the lens focus position. The CPU then automatically causes the shutter drive motor to open and close the shutter blades. The CPU then causes the drive motor to retract the lens barrel to the deployed position.

As described above, the invention provides a lens shutter camera with a movable picture taking lens that automatically sets an aperture size as the lens is continuously moved from a deployed position to a lens focus position and then quickly operates shutter blades. In this way, the time lag from the time the shutter release button is pressed to the actual initiation of the exposure process is reduced without reversing the direction of the motor and without complicated gear trains and control systems.

The present invention has been described above in terms of a presently preferred embodiment so that an understanding of the present invention can be conveyed. There are, however, many configurations for lens focus and shutter aperture assemblies not specifically described herein, but with which the present invention is applicable. The present invention should therefore not be seen as limited to the particular embodiment described herein, but rather, it should be understood that the present invention has wide applicability with respect to lens focus and shutter aperture assemblies generally. All modification, variations, or equivalent arrangements that are within the scope of the attached claims therefore should be considered within the scope of the invention.

The following elements and their corresponding reference numerals are used in the drawings:
shutter/aperture assembly 10
lens focus mechanism 12
picture taking lens 14
optical axis 16
adjustable shutter/aperture mechanism 18
lens motor assembly 20
drive screw 22
lens drive motor 24
output drive gear 26
reduction gear 28
perforated disk 30
optical counter 32
barrel gear 34
lens barrel 36
barrel nut 38
aperture ring 40
adjustment tab 42
limit tab 44
shutter blades 46
shutter pin 48
groove 50
shutter faceplate 52
shutter actuation plate 54
shutter drive motor 56
fixed frame ramp 58
camera frame 59
deployment edge 60
inclined edge 62
extension spring 64
ratchet pawl mechanism 66
ratchet teeth 68
pawl 70
pin 72
ratchet spring 73
solenoid 74
barrel extension 75
limit switch 78
conductive strip 80
metal wiper 82
first conductive pad 84
second conductive pad 86
camera 102
aperture range arrows 104
lens range arrows 106
camera on/off switch 108
shutter release button 110
film plane 112
central processor unit (CPU) 202
subject distance measuring system 204
light measuring and exposure calculating system 206

We claim:

1. An apparatus for setting the lens focus and shutter aperture of a camera having a movable picture taking lens that can be moved along an optical axis and positioned at a focus setting such that a camera subject is in focus, an adjustable shutter aperture mechanism that controls the amount of ambient light passing through the picture taking lens for producing an exposure, and a drive source that moves the picture taking lens to position the lens at the focus setting; wherein:

movement of the picture taking lens toward the focus setting position simultaneously adjusts the shutter aperture mechanism to an exposure setting that permits a predetermined amount of ambient light necessary for proper exposure to pass through the lens.

2. An apparatus as defined in claim 1, wherein the drive source comprises an electric motor that rotates a drive screw coupled to a fixed engagement nut of the picture taking lens.

3. An apparatus as defined in claim 1, wherein the shutter aperture mechanism comprises:
   a plurality of shutter blades coupled to a shutter actuation plate that is moved to open and close the shutter blades;
   a rotatable aperture ring that is rotated to limit the opening movement of the shutter blades and thereby control the amount of ambient light passing through the picture taking lens and that is coupled to the picture taking lens such that movement of the lens along the lens optical axis causes rotation of the aperture ring; and
   a ring adjustment mechanism that permits rotation of the aperture ring and then halts the rotation when the aperture ring rotates through an angular movement that permits the predetermined amount of ambient light necessary for proper exposure to pass through the lens.

4. An apparatus as defined in claim 3, wherein the aperture ring further includes an aperture limit tab that limits movement of the shutter actuation plate and thereby limits the opening movement of the shutter blades.

5. An apparatus as defined in claim 3, wherein the ring adjustment mechanism comprises:
   a setting tab projecting outwardly from the aperture ring;
   a fixed ramp against which the setting tab rests;
   adjustment force means for urging the setting tab against the frame ramp as the picture taking lens is moved along the optical axis; and
   a ring setting mechanism that halts rotation of the aperture ring when the aperture ring has rotated through an angular movement sufficient to permit the predetermined amount of ambient light to pass through the lens despite continued movement of the picture taking lens along the optical axis.

6. An apparatus as defined in claim 5, wherein the adjustment force means comprises a coil spring.

7. An apparatus as defined in claim 5, wherein the ring setting mechanism comprises:
   an aperture limit tab on the aperture ring that limits movement of the shutter actuation plate and thereby limits the opening movement of the shutter blades; and
   ratchet means for halting rotational movement of the aperture ring when it has rotated such that the limit tab is located at a position such that the shutter blades will open to the exposure setting.

8. An apparatus as defined in claim 7, wherein the ratchet means comprises:
   teeth on the outer periphery of the aperture ring;
   a ratchet pawl that engages the aperture ring teeth to halt rotation of the aperture ring;
   a ratchet spring that urges the ratchet pawl into engagement with the aperture ring teeth; and
   ratchet disengagement means for lifting the ratchet pawl against the force of the ratchet spring and out of engagement with the aperture ring teeth.

9. An apparatus as defined in claim 8, wherein the ratchet disengagement means comprises a solenoid that lifts the ratchet pawl.

10. A lens focus and shutter aperture assembly for setting the lens focus and shutter aperture of a camera to produce an exposure of a camera subject, the assembly comprising:
    a movable picture taking lens that can be moved along an optical axis and positioned at a lens focus setting such that the camera subject is in focus at a film plane of the camera;
    an adjustable shutter aperture mechanism that controls the amount of ambient light passing through the picture taking lens for producing an exposure and can be adjusted to an exposure setting at which the amount of light permitted to pass through the lens produces a correct exposure; and
    a drive source that is operated continuously in a setting direction of travel to move the picture taking lens to the focus position and simultaneously move the shutter aperture mechanism to the exposure setting.

11. An assembly as defined in claim 10, wherein the shutter aperture mechanism comprises:
    a plurality of shutter blades coupled to a shutter actuation plate that is moved to open and close the shutter blades;
    a rotatable aperture ring that is rotated to limit the opening movement of the shutter blades and thereby control the amount of ambient light passing through the picture taking lens and that is coupled to the picture taking lens such that movement of the lens along the lens optical axis causes rotation of the aperture ring; and
    a ring adjustment mechanism that permits rotation of the aperture ring and then halts the rotation when the aperture ring rotates through an angular movement that permits the predetermined amount of ambient light necessary for proper exposure to pass through the lens.

12. An assembly as defined in claim 11, wherein the ring adjustment mechanism comprises:
    a setting tab projecting outwardly from the aperture ring;
    a fixed ramp against which the setting tab rests;
    adjustment force means for urging the setting tab against the frame ramp as the picture taking lens is moved along the optical axis; and
    a ring setting mechanism that halts rotation of the aperture ring when the aperture ring has rotated through an angular movement sufficient to permit the predetermined amount of ambient light to pass through the lens despite continued movement of the picture taking lens along the optical axis.

13. An assembly as defined in claim 12, wherein the adjustment force means comprises a coil spring.

14. An assembly as defined in claim 12, wherein the ring setting mechanism comprises:
    an aperture limit tab on the aperture ring that limits movement of the shutter actuation plate and thereby limits the opening movement of the shutter blades; and
    ratchet means for halting rotational movement of the aperture ring when it has rotated such that the limit tab is located at a position such that the shutter blades will open to the exposure setting.

15. An assembly as defined in claim 14, wherein the ratchet means comprises:
   teeth on the outer periphery of the aperture ring;
   a ratchet pawl that engages the aperture ring teeth to halt rotation of the aperture ring;
   a ratchet spring that urges the ratchet pawl into engagement with the aperture ring teeth; and
   ratchet disengagement means for lifting the ratchet pawl against the force of the ratchet spring and out of engagement with the aperture ring teeth.

16. An assembly as defined in claim 15, wherein the ratchet disengagement means comprises a solenoid that lifts the ratchet pawl.

17. A lens shutter assembly for setting the lens focus and shutter aperture of a camera to produce an exposure of a camera subject, the apparatus comprising:
   a motor having a rotatable drive screw;
   a movable lens barrel carrying a picture taking lens of the camera and having a barrel nut coupled to the drive screw such that the lens barrel moves along the optical axis of the picture taking lens to a focus position when the drive screw is rotated;
   lens shutter blades that open and close to permit light to pass through the picture taking lens to a film plane of the camera;
   a shutter actuation plate coupled to the lens shutter blades such that the blades open when the shutter actuation plate is moved in a first direction and close when moved in a second direction;
   an aperture ring having an aperture limit tab that limits the extent of movement of the shutter actuation plate in the first direction and coupled to the lens barrel such that the aperture limit tab is moved to a predetermined limit position simultaneously as the barrel is moved to the focus position.

18. A camera for producing exposures of a camera subject, the camera having:
   a movable picture taking lens that can be moved along an optical axis and set at a lens focus position such that the camera subject is in focus at a film plane of the camera;
   an adjustable shutter/aperture mechanism that controls the amount of ambient light passing through the picture taking lens and can be adjusted to an exposure setting to provide an aperture at which the amount of light permitted to pass through the lens produces a correct exposure; and
   a drive source that is operated continuously in a setting direction of travel to move the picture taking lens to the lens focus position and simultaneously adjust the shutter/aperture mechanism to the exposure setting.

19. A camera as defined in claim 18, wherein the drive source moves the lens from a deployed position through an aperture setting range of travel to the focus position and then returns the lens to the deployed position.

20. A camera as defined in claim 19, wherein the aperture size is set to the exposure setting when the lens moves from the deployed position to the lens focus position and is released when the lens moves from the lens focus position to the deployed position.

* * * * *